United States Patent [19]
Rogers

[11] Patent Number: 5,243,323
[45] Date of Patent: Sep. 7, 1993

[54] SCHOOL BUS ALARM SYSTEM
[75] Inventor: Wesley D. Rogers, Huntsville, Ala.
[73] Assignee: Rogers Telecom Products, Inc., Huntsville, Ala.
[21] Appl. No.: 811,528
[22] Filed: Dec. 20, 1991
[51] Int. Cl.⁵ .............................................. B60Q 1/26
[52] U.S. Cl. ................................... 340/433; 340/457
[58] Field of Search ............... 340/433, 457, 425.5, 340/438, 527, 528, 426, 309.15; 307/10.2, 10.3

[56] References Cited
U.S. PATENT DOCUMENTS
4,866,417  9/1989  DeFino ............................. 340/429
5,128,651  7/1992  Heckart ............................ 340/433

Primary Examiner—Jin F. Ng
Assistant Examiner—Christine K. Oda

[57] ABSTRACT

A monitor system for ensuring that passengers have exited a vehicle such as a school bus is activated when the ignition of the vehicle is shut off. A buzzer sounds in response to ignition shut off, alerting the driver to disable the alarm system. If he does not do so within a predetermined period of time an alarm is actuated. A switch for disabling the alarm system is located at the rear of the bus to require the driver to walk to the rear of the bus to disable the alarm. This, in turn, requires the driver to observe whether or not any children remain in the bus.

9 Claims, 1 Drawing Sheet

SCHOOL BUS ALARM SYSTEM

BACKGROUND OF THE INVENTION

1. Field of the Invention

This invention relates to a monitor for ensuring that the driver of a vehicle such as a school bus is reminded to check that all passengers have exited the vehicle before the vehicle is locked.

2. Discussion of the Prior Art

There have been unfortunate incidents in which school children, having fallen asleep on their school buses, were obliged to spend extended periods in the school bus after it had been locked. In some cases children in these circumstances have actually perished through exposure or overheating. Abandonment of sleeping children on school buses can readily be avoided simply by ensuring that before leaving the bus the drivers of the buses walk from the normal operating position at the front of the bus to the rear of the bus, glancing into each of the seats and waking any sleeping children. However, it is likely that some drivers may forget to do so, or may simply ignore this responsibility with the result that a child sleeping in the bus could be forced to spend a full school day or a night confined in the locked bus.

No prior art device known to the inventor provides a positive reminder to the bus driver to ensure that he checks that all passengers have left the bus before he leaves and locks the bus.

OBJECTS AND SUMMARY OF THE INVENTION

It is therefore an object of the invention to provide a school bus monitor to positively remind the driver of the bus to verify that all passengers have exited the bus before it is locked, and to give an alarm if the driver neglects to do so.

The present invention overcomes the deficiencies of the art and satisfies the object of the invention listed above by provision of a school bus monitor comprising an alarm device adapted to give an alarm a predetermined time after the ignition of the vehicle has been shut off unless the driver throws an alarm cutoff switch located at the rear of the bus. In this way the driver is forced to walk to the rear of the bus and operate the cutoff switch shortly after shutting off the ignition of the bus. If he does not do so, the alarm is given to ensure that he is reminded to do so. The alarm may be given by flashing the headlights of the bus, sounding its horn or both. A buzzer sounding immediately when the ignition of the bus is shut off may also be provided to remind the driver of his responsibility to disable the alarm system.

A service switch is also provided for disabling the overall monitor system so as to allow a mechanic or the like to operate the ignition without giving the alarm. In order to prevent the driver from actuating the service switch and thus disabling the system, the service switch is disposed remote from the driver's normal location, for example, in the engine compartment of the vehicle.

BRIEF DESCRIPTION OF THE DRAWING

The invention will be better understood if reference is made to the accompanying drawing, in which.

DESCRIPTION OF THE PREFERRED EMBODIMENTS

Figure 1:
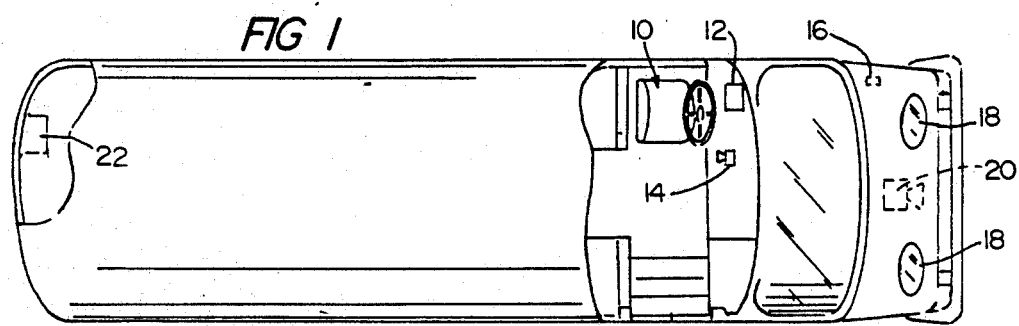
FIG. 1 is a schematic plan view of a school bus fitted with the monitor system according to the present invention.

In FIG. 1, the bus driver's normal location is indicated generally at 10. The principal elements of the monitor system of the invention are indicated schematically at 12. A buzzer 14 may be mounted separately, as shown. A service switch 16 for disabling the monitoring system of the present invention is mounted remote from the operator's position 10, typically in the engine compartment as shown. The headlights 18 and horn 20 of the bus are controlled by the monitor system to be energized intermittently or the like under appropriate circumstances. An alarm cutoff switch 22, preferably requiring a key for operation, is disposed at the rear of the bus.

The monitor system of the invention is actuated when the driver shuts off the ignition of the bus, e.g., to store the bus during the school day, or upon arriving at its normal night time parking space. The buzzer 14 immediately begins to sound, alerting the driver that he must inspect the bus to make sure no passengers remain on board. In doing so he will walk to the rear of the bus, and will glance from side to side to confirm that no passengers remain on the bus. When the driver reaches the rear of the bus he actuates the alarm cutoff switch 22. If he fails to do so, the monitor system causes the lights 18 to flash and the horn 20 to sound after a predetermined delay, typically thirty seconds. This continues until the driver actuates the alarm cutoff switch 22.

It is evident that from time to time buses require service, and that it would be a great inconvenience to service workers, mechanics and the like if the buzzer, the lights and the horn were all operated as above when a mechanic operated the ignition switch of the vehicle to service it. Therefore, a service switch 16 is provided to disable the alarm system when service is necessary. In order that the driver cannot readily access the service switch and defeat the monitor system, it is provided in a location remote from the usual operator position 10. Conveniently, the service switch 16 can be mounted in the engine compartment of the vehicle, as indicated.

Figure 2:
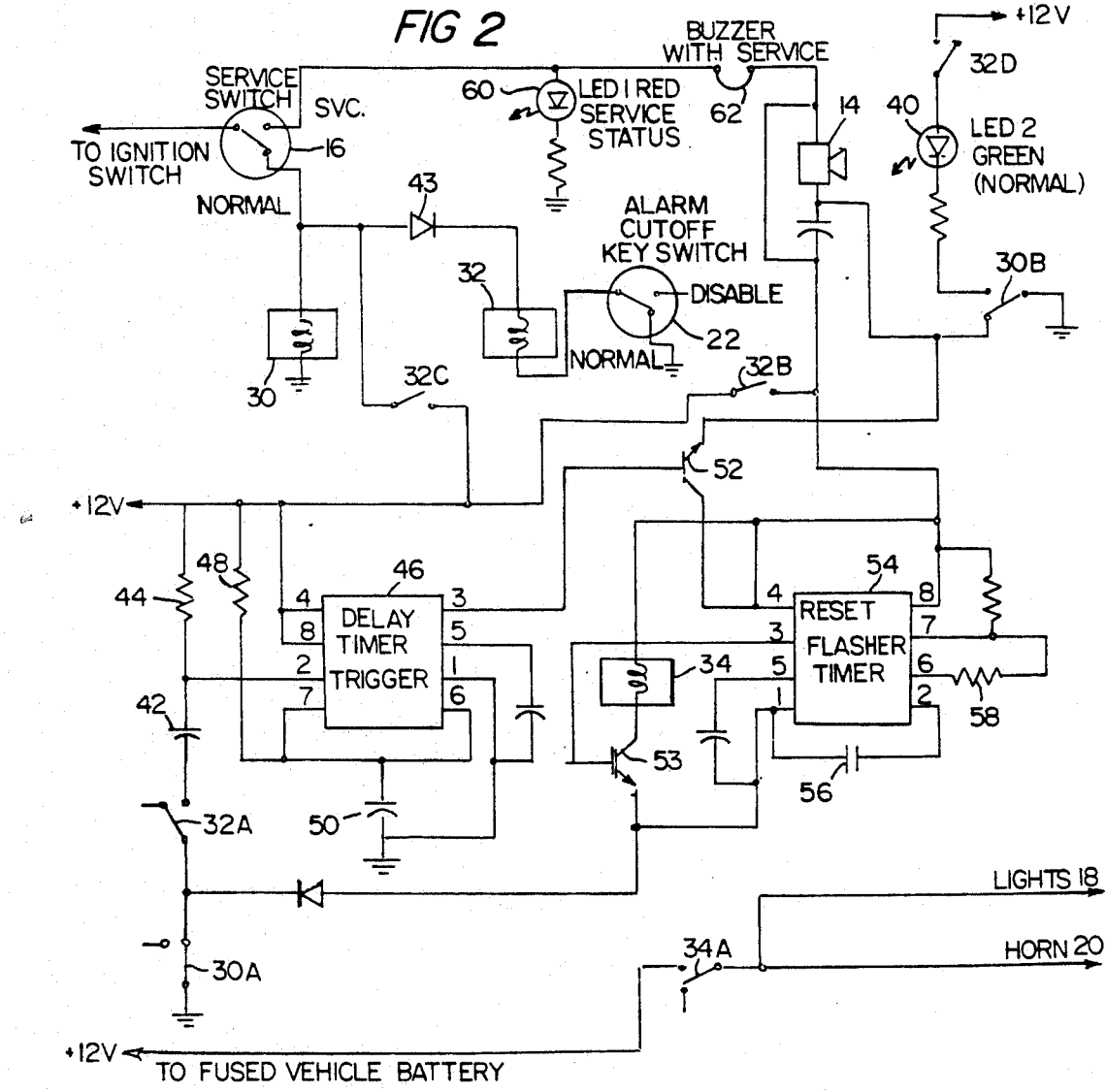
FIG. 2 is a schematic circuit diagram of a monitor system according to the present invention, showing its connections to the remainder of the electrical system of the bus.

FIG. 2 shows a schematic diagram of one exemplary circuit for carrying out the functions of the monitor system of the invention as described. The service switch 16, the alarm cutoff key switch 22, the buzzer 14, the lights 18 and the horn 20 of FIG. 1 are also shown in FIG. 2. The circuit also comprises three relays, each comprising a coil 30, 32 and 34 and a number of contact sets. The contact sets controlled by the coils 30, 32, 34 are respectively numbered 30A, 30B, 32A, 32B, and so on. Thus contact set 30A is a first set of contacts controlled by the relay coil 30, set 30B is controlled similarly, and so on. As is conventional, each of the contact sets 30A, 30B are shown in their normal positions, that is, in the positions taken with power to the monitor system of the invention entirely off.

When the ignition switch of the vehicle is switched on, e.g. to start the bus, power from the ignition switch 38 is supplied through the service switch 16, in its normal position shown, to relay coils 30 and 32. Alarm cutoff switch 22 is also in series with relay coil 32. Accordingly, when the ignition is switched on, the various contact sets 30A, 32A controlled by coils 30 and 32 are switched to the opposite of the positions shown. For example, contact sets 30B and 32D are then closed, lighting a green LED 40. Thus this green LED 40 is lit at all times during normal operation of the bus, providing an indication of normal system status.

At the end of the period of use of the bus, when the ignition switch is turned off, relay coil 30 is released while relay coil 32 remains energized via power supplied through contact set 32C and diode 43. Relay coil 30 having been released, contact set 30B switches back to the normal position shown in FIG. 2, wherein buzzer 14 sounds and green LED 40 is extinguished. This indication reminds the driver of the bus that unless he disables the alarm circuit, the alarm will shortly sound. At the same instant, capacitor 42 begins to charge through contact sets 32A and 30A and resistor 44. At the same time, a negative-going current spike is applied to a delay timer 46, resetting it. In the exemplary circuit shown, delay timer 46 is an industry standard Model 555 digital timer. In this embodiment the negative-going current spike is applied to pin 2 of the delay timer 46. Pin 3 of delay timer 46 is held high during the timing interval determined by the values of resistor 48 and capacitor 50, turning on transistor 52. The values of resistor 48 and capacitor 50 are chosen to establish a time constant on the order of thirty seconds. During this thirty-second interval, the reset pin 4 of a second industry standard Model 555 flasher timer 54 is held low by transistor 52. (In a particularly preferred embodiment, timers 46 and 54 can be provided by the two halves of an industry standard Model 556 dual digital timer.) When timer 46 times out, typically in about thirty seconds, pin 3 of timer 46 goes low, turning off transistor 52. Pin 4 of flasher timer 54 then goes high, beginning a flashing interval determined by the values of resistor 58 and capacitor 56, and energizing a third relay coil 34 through transistor 53. When coil 34 is energized power is applied to the lights 18 and horn 20 of the bus through contact set 34A. The lights and horn thus give an alarm commencing thirty seconds after the ignition switch is deactivated unless the system is disabled. Relay coil 34 is operated by transistor 53 in accordance with the status of flasher timer 54, flashing the lights and blowing the horn intermittently. Capacitor 56 and resistor 58 provide a time constant for periodically resetting the flasher timer 54. Typically the values of these components are chosen so that the lights flash on and off and the horn sounds at approximately one-second intervals.

On the other hand, if the driver reaches the rear of the bus before the thirty-second interval of delay timer 46 is reached and throws the cutoff switch 22 to its disable position, relay coil 32 is de-energized. Contact set 32A then opens, preventing the delay timer 46 from energizing the flasher timer 54.

As noted, a service switch 16 is provided to allow the ignition of the vehicle to be operated without energizing the system. A second red service status LED 60 is illuminated when the service switch 16 is in the service position. As noted, preferably the service switch 16 is disposed in the engine compartment of the bus to prevent the driver from throwing the service switch 16 and disabling the alarm system. As indicated, the service status LED 60 is illuminated when the service switch 16 is in the service position, alerting the driver that the system is not in normal operational status. If desired, the buzzer 14 can be energized whenever the service switch 16 is in the service position by providing a jumper 62 between two connection points. This would make it undesirable for the driver to drive with the service switch 16 in the service position, as he would be obliged to listen to the buzzer 14.

The circuit of FIG. 2 thus provides an alarm given automatically a short period after the ignition of the bus is turned off if the alarm cutoff switch 22 is not thrown promptly. If the operator does not reset the alarm cutoff switch 22 to the normal position when he starts the bus, the green LED 40 does not light, indicating a fault in the system. By disposing the alarm cutoff switch 22 at the rear of the bus, the driver is obliged to walk through the bus just after shutting off its motor, ensuring that he will have an opportunity to observe whether all passengers have exited the bus. The reminder provided by the buzzer 14 will prompt the driver to make this inspection immediately, so that ordinarily the alarm will not be given.

Having described preferred and alternative embodiments of a new and improved bus monitor, it is believed that other modifications, variations and changes will be suggested to those skilled in the art in view of the teachings set forth herein. For example, the utility of the monitor of the invention is not limited to school buses. Further, the monitor of the invention could be activated in response to shutting off the motor of the bus other than by means of the ignition switch, for example, by a fuel pressure sensor or the like. It is therefore to be understood that all such variations, modifications and changes are believed to fall with the scope of the present invention as defined by the appended claims.

What is claimed is:

1. A monitor for ensuring that passengers are not confined in a bus comprising a motor and being controlled from a driver's seat for a driver located at the front of the bus, said monitor comprising:
    alarm means for providing an alarm commencing after a predetermined delay period initiated in response to the motor of the bus being shut off, unless said alarm means is manually disabled, and
    manually actuable cutoff switch means for selectively disabling said alarm means, said cutoff switch means being disposed at a location in the bus that is inaccessible from the driver's seat;
    wherein said alarm means comprises a first timer for determining said predetermined delay period;
    wherein said alarm means further comprises a second timer for intermittently operating said alarm.

2. The monitor of claim 1, wherein said alarm comprises a horn of the bus.

3. In a bus having a passenger compartment with a front end and a rear end separated by plural rows of passenger seats, and a driver's seat for a bus driver located at the front end along with an on-off ignition switch for actuating-deactuating, respectively, an engine, and wherein the rear end of the bus is only accessible to the driver when the driver moves from the driver's seat and passes the rows of passenger seats, a warning system for prompting the driver to check for passengers remaining in the passenger seats after the ignition switch has been turned off, said system comprising:
    a manually actuable cutoff switch disposed at the rear of the bus, said cutoff switch having first and second positions;
    a timer actuable in response to the ignition switch being turned off when said cutoff switch is in said first position for establishing a predetermined time interval;

an alarm circuit responsive to said timer for providing an alarm signal upon termination of said predetermined time interval; and alarm means responsive to said alarm signal for providing an alarm indication;

wherein said cutoff switch in said second position disables said timer, both during and after said predetermined time interval, to inhibit said alarm signal from said alarm circuit;

whereby, to inhibit said alarm indication, the driver must move to the rear of the bus, past the rows of passenger seats, and switch the cutoff switch to said second position.

4. The system of claim 3 further comprising an indicator actuable in the on position of the ignition switch for providing an indication of said cutoff switch being in a predetermined one of said first and said second positions.

5. The system of claim 3 further comprising an indicator for providing an alert indication at the driver's seat in response to turning the ignition switch to the off position when said cutoff switch is in said first position, thereby alerting the driver to switch said cutoff switch to said second position to inhibit said alarm indication.

6. The system of claim 3 wherein the bus further includes an engine compartment inaccessible from the passenger compartment, said system further comprising:

a manually actuable service switch disposed in said engine compartment for selectively disabling said system to permit servicing of the engine without providing said alarm indication.

7. A method for prompting the driver of a bus to confirm that all passengers have exited the bus before the bus is locked and stored, said method comprising the steps of:

(a) in response to shutting off the bus engine, automatically initiating a time interval of predetermined duration;

(b) upon completion of said time interval, activating an alarm;

(c) permitting said alarm to be manually inhibited by actuation of a cutoff switch located at the rear of the bus and inaccessible from the driver's seat, to prematurely terminate said time interval when said cutoff switch is actuated before said time interval is completed, or to deactuate said alarm when said cutoff switch is actuated after activation of said alarm;

whereby, the driver of the bus is required to proceed to the rear of the bus and thereby pass all of the passenger seats to prevent or terminate activation of said alarm.

8. The method of claim 7 further comprising the step of providing an indication that said alarm is armed for activation.

9. The method of claim 7 further comprising the steps of alerting the driver of impending activation of the alarm after the engine has been shut off.

* * * * *